United States Patent [19]

Muramatsu et al.

[11] Patent Number: 5,145,156

[45] Date of Patent: Sep. 8, 1992

[54] FLUID-FILLED ELASTIC MOUNT HAVING TWO DIFFERENTLY TUNED ORIFICES SELECTIVELY UTILIZED FOR DAMPING OR ISOLATING VIBRATIONS IN DIFFERENT FREQUENCY RANGES

[75] Inventors: Atsushi Muramatsu, Komaki; Yoshiki Funahashi, Iwakura, both of Japan

[73] Assignee: Tokai Rubber Industries, Ltd., Japan

[21] Appl. No.: 646,858

[22] Filed: Jan. 28, 1991

[30] Foreign Application Priority Data

Feb. 2, 1990 [JP] Japan .................................. 2-24984

[51] Int. Cl.⁵ .......................................... F16F 13/00
[52] U.S. Cl. ................................ 267/140.14; 180/300; 180/312; 248/562; 248/636; 267/35; 267/219; 267/64.28; 267/64.14; 267/140.13
[58] Field of Search ............. 267/140.1, 219, 218, 267/122, 35, 64.11, 225, 226, 64.14, 64.28, 64.27, 64.23, 64.25, 64.19, 140.1 A, 140.1 AE, 140.1 R; 180/300, 312, 902; 248/636, 562, 638, 550

[56] References Cited

U.S. PATENT DOCUMENTS

| | | | |
|---|---|---|---|
| 4,650,169 | 3/1987 | Eberhard et al. | 267/140.1 |
| 4,657,227 | 4/1987 | Hofmann | 267/35 X |
| 4,666,016 | 5/1987 | Abe et al. | 267/140.1 X |
| 4,697,793 | 10/1987 | Reuter et al. | 267/140.1 A |
| 4,720,084 | 1/1988 | Hollerweger et al. | 267/140.1 X |
| 4,828,234 | 5/1989 | Hoying et al. | 267/140.1 AE |
| 4,840,358 | 6/1989 | Hoying et al. | 267/140.1 AE |
| 4,869,477 | 9/1989 | Hoying et al. | 267/140.1 |
| 4,886,251 | 12/1989 | Häussermann | 267/140.1 |
| 4,886,252 | 12/1989 | Haussermann | 267/219 X |
| 4,893,797 | 1/1990 | LeFol et al. | 267/140.1 |
| 4,901,986 | 2/1990 | Smith | 267/140.1 AE |
| 4,925,162 | 5/1990 | Kojima | 267/219 X |
| 5,029,823 | 7/1991 | Hodgron et al. | 267/219 X |
| 5,039,073 | 8/1991 | Reichard et al. | 180/312 X |
| 5,060,919 | 10/1991 | Takano et al. | 267/140.1 AE |
| 5,092,566 | 3/1992 | Freudenberg | 267/140.1 AE |
| 5,098,072 | 3/1992 | Muramatsu et al. | 267/219 X |

FOREIGN PATENT DOCUMENTS

| | | |
|---|---|---|
| 0298862 | 1/1989 | European Pat. Off. . |
| 0324613 | 7/1989 | European Pat. Off. . |
| 2547378 | 12/1984 | France . |
| 2573156 | 5/1986 | France . |
| 55-107142 | 8/1980 | Japan . |
| 57-9340 | 1/1982 | Japan . |
| 0192140 | 9/1985 | Japan .................. 267/219 |
| 0208649 | 10/1985 | Japan .................. 267/140.1 |
| 60-220239 | 11/1985 | Japan . |
| 0226329 | 10/1986 | Japan .................. 180/312 |
| 0278639 | 12/1986 | Japan .................. 267/219 |
| 0074334 | 3/1989 | Japan .................. 267/140.1 |

OTHER PUBLICATIONS

*Patent Abstracts of Japan*, vol. 10, No. 227, Aug. 7, 1986 & JP 61-62631 dated Mar. 31, 1986.

Primary Examiner—Douglas C. Butler
Attorney, Agent, or Firm—Parkhurst, Wendel & Rossi

[57] ABSTRACT

A fluid-filled elastic mount including a first support structure and a second support structure which are spaced from each other in a load-receiving direction, an elastic body for elastically connecting these structures, and a partition structure supported by the second support structure. The elastic mount has a pressure-receiving chamber partially defined by the elastic body, first and second variable-volume equilibrium chambers partially defined by respective flexible diaphragms, and first and second air chambers for permitting the respective diaphragms to elastically deform. The pressure-receiving chamber communicates with the first and second equilibrium chambers, through respective orifice passages which are tuned to different frequency ranges of vibrations. The present elastic mount includes a pressure control device connected to the second air chamber for changing a pressure in the second air chamber.

10 Claims, 3 Drawing Sheets

FLUID-FILLED ELASTIC MOUNT HAVING TWO DIFFERENTLY TUNED ORIFICES SELECTIVELY UTILIZED FOR DAMPING OR ISOLATING VIBRATIONS IN DIFFERENT FREQUENCY RANGES

BACKGROUND OF THE INVENTION

1. Field of the Invention

The present invention relates in general to a fluid-filled elastic mount for damping or isolating vibrations based on flows of a non-compressible fluid contained therein. More particularly, the present invention is concerned with such a fluid-filled elastic mount which is simple in construction, and is capable of exhibiting different vibration damping or isolating characteristics depending upon the type of the vibrations applied thereto.

2. Discussion of the Prior Art

An elastic mount is known as a vibration damping device interposed between two members of a vibration system, for flexibly connecting these two members. As a type of this elastic mount, there is known a so-called fluid-filled elastic mount as disclosed in laid-open Publication No. 55-107142 of unexamined Japanese Patent Application. The elastic mount disclosed in this publication includes a first and a second support structure which are spaced apart from each other in a load-receiving direction and are elastically connected to each other by an elastic body interposed therebetween. The elastic mount further includes a partition member supported by the second support structure so as to extend in a direction substantially perpendicular to the load-receiving direction, and thereby cooperate with the elastic body to at least partially define a pressure-receiving chamber on the side of the first support structure. On the other side of the partition member on the side of the second support structure, there is provided a variable-volume equilibrium chamber which is partially defined by a flexible diaphragm. These pressure-receiving and equilibrium chambers are filled with a non-compressible fluid, and communicates with each other by an orifice passage. A pressure in the pressure-receiving chamber changes due to elastic deformation of the elastic body upon application of vibrations in the load-receiving direction. The fluid-filled elastic mount damps or isolates the input vibrations based on the resonance of the fluid mass flowing through the orifice passage more effectively than an elastic mount which relies on only the elastic property of the elastic body for damping the input vibrations. For this reason, the elastic mount of this type is widely used for motor vehicles, for example, as a mount for mounting the engine on the vehicle body.

Generally, the fluid-filled elastic mount, when used as a vehicle engine mount, is required to exhibit a high degree of damping characteristic with respect to low-frequency vibrations, such as engine shake and bounce, and exhibit a sufficiently low dynamic spring constant with respect to medium-frequency vibrations such as engine idling vibrations, and high-frequency vibrations such as booming noise. However, an improvement in the vibration isolating function based on the resonance of the fluid mass flowing through the orifice passage can be provided with respect to only the vibrations whose frequencies are in the neighborhood of the frequency to which the orifice passage is tuned. Where the orifice passage is tuned to effectively damp the low-frequency vibrations based on the resonance of the fluid mass flowing through the orifice passage, the orifice passage operates as if the passage was substantially closed when the mount receives the vibrations whose frequencies are higher than the tuned frequency of the orifice passage. As a result, the elastic mount suffers from an undesirably increased dynamic spring constant, and from a considerable deterioration of the damping or isolating function with respect to the medium- to high-frequency vibrations.

In view of the above drawback of the known fluid-filled elastic mount, a fluid-filled elastic mount with a pressure absorbing system is proposed as disclosed in laid-open Publication No. 57-9340 of unexamined Japanese Patent Application. In this fluid-filled elastic mount, the partition member disposed between the pressure-receiving and equilibrium chambers is provided with a movable member which can be displaced by a predetermined distance in the direction of opposition of the two chambers (i.e., the load-receiving direction). When the elastic mount receives high-frequency vibrations, this arrangement serves to avoid an unfavorable increase in the dynamic spring constant of the elastic mount resulting from the substantially closed orifice passage, since a pressure change which occurs in the pressure-receiving chamber is absorbed by the displacement of the movable member.

The pressure absorbing system used in the above-described elastic mount is effective to isolate the high-frequency, small-amplitude vibrations. However, when the amount of displacement of the movable member is set to be a comparatively large value, in an attempt to provide an effectively lowered dynamic spring constant with respect to the medium-frequency vibrations having relatively large amplitudes, the movable member may be displaced to an extent to absorb a pressure change in the pressure-receiving chamber which occurs upon application of the low-frequency vibrations as well as the medium-frequency vibrations. In this case, a sufficient amount of the fluid is unlikely to flow through the orifice passage upon application of the low-frequency vibrations, resulting in deterioration in the vibration damping characteristic of the mount for the low-frequency vibrations. Thus, the proposed elastic mount is incapable of providing a sufficient degree of isolating characteristic with respect to the medium-frequency vibrations such as engine idling vibrations.

To solve the problem encountered in the proposed fluid-filled elastic mount, it is proposed to provide two mutually independent orifice passages, one of which is tuned to provide a sufficiently reduced dynamic spring constant so as to isolate the medium- to high-frequency vibrations, and the other of which is tuned to provide an excellent damping effect for the low-frequency vibrations.

The above-indicated one of the two differently tuned orifice passages is tuned so that the resonance frequency of the fluid mass flowing therethrough is higher than that of the fluid mass flowing through the other orifice passage, and so that the flow resistance of the fluid in the one orifice passage is smaller than that of the fluid in the other orifice passage. Therefore, the fluid filling the elastic mount is unlikely to flow through the other orifice passage having a relatively high flow resistance of the fluid. Consequently, it is rather difficult to ensure a sufficient amount of the fluid flowing through the other orifice passage so as to effectively damp the low-frequency vibrations.

In view of the above drawback of the proposed fluid-filled elastic mount, the applicant of the present application proposed another fluid-filled elastic mount as disclosed in laid-open Publication No. 60-220239 of unexamined Japanese Patent Application, which includes a control valve for selectively opening and closing the above-indicated one orifice passage tuned to the higher resonance frequency, and an actuator for operating the control valve. The control valve is operated by the actuator, so that the above-indicated one orifice passage is automatically opened and closed to permit the elastic mount to exhibit different vibration isolating or damping characteristics, based on the fluid flows through the selected one of the two orifice passages, depending upon the type of the input vibration.

In the thus constructed fluid-filled elastic mount, however, the provision of the control valve disposed in the relevant orifice passage along with the actuator disposed in the elastic mount results in increased structural complexity and a comparatively large size of the elastic mount. Accordingly, the cost of manufacture of the elastic mount is inevitably increased.

SUMMARY OF THE INVENTION

It is therefore an object of the present invention to provide a fluid-filled elastic mount which is simple in construction, and which is capable of selectively exhibiting different vibration isolating or damping characteristics based on resonance of a non-compressible fluid flowing through a selected one of two differently tuned orifice passages, depending upon the type of the input vibration.

The above object may be achieved according to the principle of the present invention, which provides a fluid-filled elastic mount comprising: (a) a first support structure and a second support structure which are respectively fixed to the two members to be flexibly connected, and which are spaced apart from each other in a load-receiving direction in which vibrations are applied to the elastic mount; (b) an elastic body interposed between the first and second support structures for elastically connecting the first and second support structures; (c) a partition structure supported by the second support structure so as to extend in a direction substantially perpendicular to the load-receiving direction, the elastic body at least partially defining pressure-receiving chamber disposed on one of opposite sides of the partition structure on the side of the first support structure, the pressure-receiving chamber being filled with a non-compressible fluid, a pressure of the fluid in the pressure-receiving chamber changing due to elastic deformation of the elastic body upon application of the vibrations in the load-receiving direction; (d) a first flexible diaphragm cooperating with the partition structure to define a first variable-volume equilibrium chamber disposed on the other side of the partition structure remote from the pressure-receiving chamber, the first equilibrium chamber being filled with the non-compressible fluid, the first flexible diaphragm being elastically deformable so as to absorb a change in a pressure of the fluid within the first equilibrium chamber, the second support structure and the first flexible diaphragm cooperating with each other to define a first air chamber which is separated from the first equilibrium chamber by the first flexible diaphragm, for permitting the first flexible diaphragm to elastically deform, the partition structure at least partially defining a first orifice passage for fluid communication between the pressure-receiving and first equilibrium chambers to permit flows of the fluid therebetween; (e) a second flexible diaphragm cooperating with the partition structure to define a second variable-volume equilibrium chamber disposed on the other side of the partition structure remote from the pressure-receiving chamber and formed independently of the first equilibrium chamber, the second equilibrium chamber being filled with the non-compressible fluid, the second flexible diaphragm being elastically deformable so as to absorb a change in a pressure of the fluid within the second equilibrium chamber, the second support structure and the second flexible diaphragm cooperating with each other to define a second air chamber which is separated from the second equilibrium chamber by the second flexible diaphragm, for permitting the second flexible diaphragm to elastically deform, the partition structure at least partially defining a second orifice passage for fluid communication between the pressure-receiving and second equilibrium chambers to permit flows of the fluid therebetween, the second orifice passage having a ratio of a cross sectional area thereof to a length thereof, which ratio is higher than that of the first orifice passage; and (f) pressure control means connected to the second air chamber for changing a pressure in the second air chamber.

In the fluid-filled elastic mount of the present invention constructed as described above, the pressure control means is operated so that a selected one of two different pressures is applied to the second air chamber which is separated from the second equilibrium chamber by the second flexible film. As a result, the non-compressible fluid filling the mount is forced to flow through a selected one of the first and second orifice passages which are tuned to different frequency ranges of vibrations. Thus, the vibration damping or isolating characteristics of the present elastic mount can be changed by selecting the orifice passage through which the fluid mainly flows, depending upon the type of the input vibration. Since the pressure control means may be disposed outside the body of the elastic mount, the present elastic mount does not require a control valve, an actuator and other devices incorporated within the elastic mount.

Namely, the fluid-filled elastic mount of the invention is considerably simple in construction, and is capable of providing different vibration damping and isolating effects for input vibrations in different frequency ranges, based on the resonance of the fluid flowing through the selected one of the two differently tuned orifice passages.

In one preferred form of the present invention, the pressure control means is also connected to the first air chamber which is separated from the first equilibrium chamber by the first flexible diaphragm, so as to change the pressure in the first air chamber. When a first pressure, e.g., a sub-atmospheric pressure lower than the atmospheric pressure, is applied to the first air chamber, the fluid flows through the first orifice passage are effectively inhibited with the deformation or displacement of the first flexible diaphragm prevented by the sub-atmospheric pressure, whereby the application of the sub-atmospheric pressure assures a sufficient amount of the fluid flowing through the second orifice passage upon application of the vibrations to be isolated by the second orifice passage.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
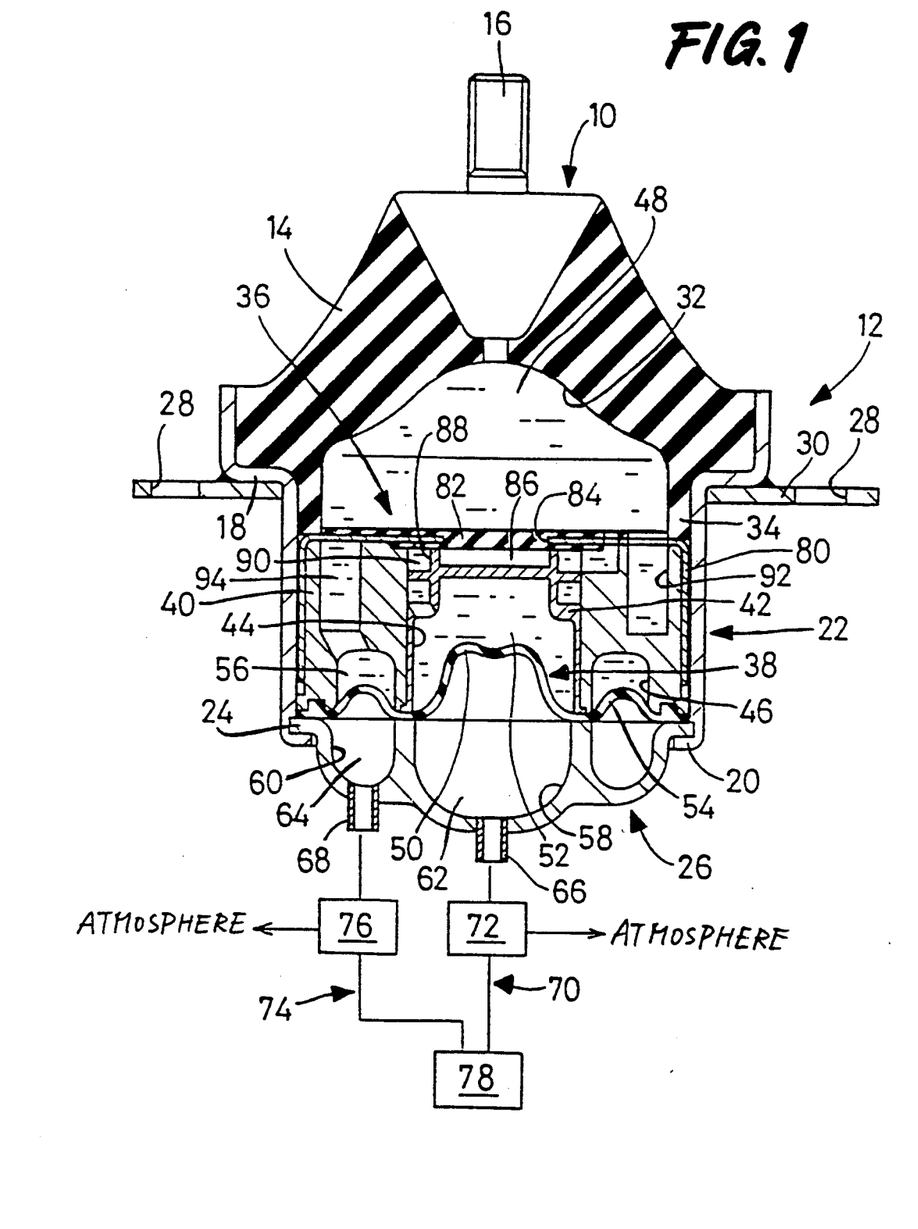
FIG. 1 is an elevational view in axial cross section of on embodiment of a fluid-filled elastic mount of the present invention in the form of an engine mount for a motor vehicle.

Referring first to FIG. 1 showing the vehicle engine mount as one embodiment of the fluid-filled elastic mount of this invention, reference numerals 10 and 12 denote a first and a second rigid support structure, respectively. These first and second support structures 10, 12 are spaced apart from each other by a suitable distance in a load-receiving direction in which vibrations are received by the elastic mount. Between the first and second support structures 10, 12, there is formed an elastic body 14 so that the two structures 10, 12 are elastically connected to each other. The elastic mount is installed on a vehicle such that the first support structure 10 is fixed to an engine unit of the vehicle while the second support structure 12 is fixed to a body of the vehicle. Thus, the engine unit is flexibly mounted on the vehicle body in a vibration damping or isolating manner. With the elastic mount installed in position on the vehicle as described above, the weight of the engine unit acts on the mount in the load-receiving direction in which the first and second support structures 10, 12 are opposed to each other, whereby the elastic body 14 is elastically deformed or contracted so that the first and second support structures 10, 12 are moved toward each other from the pre-installation positions by a suitable distance in that load-receiving direction. The instant elastic mount is adapted to damp or isolate the input vibrations which are applied primarily in the load-receiving direction (vertical direction as viewed in FIG. 1.

More specifically, the first support structure 10 is a metallic member having a generally truncated conical shape. A mounting bolt 16 is formed integrally with the first support structure 10 such that the bolt 16 extends in the load-receiving direction from a central portion of the large-diameter end face of the first support structure 10, axially outwardly of the elastic-mount. The elastic mount is fixed to the engine unit of the vehicle through the mounting bolt 16. On the other hand, the second support structure 12 consists of a generally cylindrical member 22 having an axially. intermediate shoulder portion 18, a caulked portion 20 formed at its small-diameter open end remote from the first support structure 10, and a generally cup-shaped bottom member 26 with an outward flange 24 formed at its open end adjacent to the cylindrical member 22. The cylindrical member 22 is fixed to the bottom member 26 with the caulked portion 20 being caulked against the outward flange 24, so that the small-diameter opening of the cylindrical member 22 is closed by the bottom member 24. Thus, the second support structure 12 is generally cup-shaped, with its open end positioned on the side of the first support structure 10. An annular plate 30 with a plurality of through-holes 28 formed therethrough is integrally secured to the cylindrical member 22 of the second support structure 12, so as to extend radially outwardly from the shoulder portion 18 of the member 22. The elastic mount is fixed to the vehicle body by means of bolts inserted through the through-holes 28 of the annular plate 30.

The first and second support structures 10, 12 are positioned concentrically or coaxially with each other, with a suitable axial distance therebetween, such that the cup-shaped second support structure 12 is open facing the small-diameter end face of the first support structure 10. Between these two support structures 10, 12, there is formed by vulcanization the elastic body 14 indicated above.

The elastic body 14 has a generally truncated conical shape, and is formed with a cavity 32 which is open in its large-diameter end face on the side of the second support structure 12. The elastic body 14 is bonded at its small-diameter end face to the outer surface of the first support structure 10, and at the outer surface of its large-diameter end portion to the inner surface of the open end portion of the cup-shaped second support structure 12. Thus, the first and second support structures 10, 12 and the elastic body 14 are integrally assembled together such that the two support structures 10, 12 are elastically connected to each other by the elastic body 14. The elastic body 14 includes an annular protrusion 34 formed as an integral part thereof on its large-diameter end face, such that the protrusion 34 extends by a suitable distance toward the bottom wall of the cup-shaped second support structure 12, along the inner surface of the cylindrical member 22.

In the second support structure 12, there is accommodated a thick-walled partition structure 36 having a generally disk-like shape as a whole, such that the structure 36 extends in a direction substantially perpendicular to the load-receiving direction in which the first and second support structures 10, 12 are opposed to each other. One of opposite axial end faces of the partition structure 36 abuts on the bottom member 26 of the second support structure 12, while the other axial end face abuts at its peripheral portion on the annular protrusion 34 of the elastic body 14. Thus, the partition structure 36 is fixed in position with respect to the second support structure 12, such that the structure 36 is sandwiched by and between the bottom member 26 and the annular protrusion 34 of the elastic body 14.

Between the partition structure 36 and the bottom member 26, there is provided a circular thin-walled flexible diaphragm 38 formed of a rubber material, such that the diaphragm 38 is fixed in position while being gripped by and between the partition structure 36 and the bottom member 26.

The partition structure 36 includes a generally cylindrical outer member 40 having a comparatively thick wall thickness, and a generally cylindrical inner member 42 which is fitted in an inner bore of the outer member 40, and which is closed at one axial end thereof on the side of the first support structure 10. The thus constructed partition structure 36 is provided at its radially inner portion with a first opening 44 corresponding to an inner bore of the inner member 42, and at its radially outer portion with a second opening 46 annularly formed in the outer member 40 in the circumferential direction around the first opening 44. These first and second openings 44, 46 are both open toward the bottom member 26 of the second support structure 12.

With the partition structure 36 fixed in place in the elastic mount as described above, a pressure-receiving chamber 48 is provided on one of opposite sides of the partition structure 36 on the side of the first support structure 10, such that the chamber 48 is partially defined by the inner wall of the elastic body 14 defining the cavity 32. Upon application of vibrations to the elastic mount, a pressure of the fluid in the pressure-receiving chamber 48 changes as a result of a volumetric change of the chamber 38 due to elastic deformation of the elastic body 14.

On the other side of the partition structure 36 on the side of the bottom member 26 of the second support structure 12, the first opening 44 is closed by a radially inner portion 50 of the diaphragm 38, so that a first variable-volume equilibrium chamber 52 is defined by the inner member 42 of the partition structure 36 and the diaphragm 38. The first equilibrium chamber 52 thus formed at the radially inner portion of the partition structure 36 will not undergo a pressure change upon application of vibrations to the elastic mount, since the pressure change is absorbed by a volumetric change of the chamber 52 which occurs due to elastic displacement of the radially inner portion 50 of the flexible diaphragm 38. Radially outwardly of the first equilibrium chamber 52, a second variable-volume equilibrium chamber 56 is defined by the outer member 40 of the partition structure 36 and a radially outer portion 54 of the diaphragm 38, with the second opening 46 being closed by that portion 54 of the diaphragm 38. The pressure change of this second equilibrium chamber 54 is also absorbed by a volumetric change thereof which occurs due to elastic displacement of the radially outer portion 54 of the flexible diaphragm 38. It will be understood from the above description of the instant embodiment that the radially inner and outer portions 50, 54 of the diaphragm 38 serve as a first and a second flexible diaphragm, respectively, for partially defining the first and second equilibrium chambers 52, 56.

The pressure-receiving chamber 48, and the first and second equilibrium chambers 52, 56 are filled with a suitable non-compressible fluid, such as water, alkylene glycol, polyalkylene glycol, or silicone oil.

The bottom member 26 of the second support structure 12 has an inner recess 58 and an annular outer recess 60 formed at respective radially inner and outer portions thereof which are aligned with the first and second openings 44, 46 of the partition structure 36, respectively. On one side of the radially inner portion 50 of the diaphragm 38 remote from the first equilibrium chamber 52, that is, between that portion 50 of the diaphragm 38 and a portion of the bottom member 26 defining the inner recess 58, there is defined a first air chamber 62 which functions to allow the inner diaphragm portion 50 to deform when a fluid pressure is applied to the first equilibrium chamber 52. Likewise, on one side of the radially outer portion 54 of the diaphragm 38 remote from the second equilibrium chamber 56, that is, between that portion 54 of the diaphragm 38 and a portion of the bottom member 26 defining the outer recess 60, there is defined a second air chamber 64 which functions to allow the outer diaphragm portion 54 to deform when a fluid pressure is applied to the second equilibrium chamber 56. The first and second air chambers 62, 64 are formed as fluid-tight spaces or enclosures within the engine mount.

The first air chamber 62 communicates with an air conduit 70, through a connector 66 whose fixed end is fitted in a hole formed through the radially inner portion of the bottom member 26, while the second air chamber 64 communicates with an air conduit 74, through a connector 68 whose fixed end is fitted in a hole formed through the radially outer portion of the bottom member 26. These air conduits 70, 74 are connected via respective switch valves 72, 76 to a vacuum pressure source 78 for providing a sub-atmospheric pressure which is lower than the atmospheric pressure. Each of the switch valves 72, 76 is selectively placed in a first position for communication of the corresponding air chamber 62, 64 with the atmosphere, and a second position for communication of the air chamber 62, 64 with the vacuum pressure source 78, so that a selected one of the atmospheric pressure and the sub-atmospheric pressure is applied to the corresponding air chamber 62, 64. In the instant embodiment, the vacuum pressure source 78, switch valves 72, 76, air conduits 70, 74 and connectors 66, 68 constitute pressure changing means for changing the pressures in the first and second air chambers 62, 64.

The instant elastic mount further includes a relatively thin-walled, cap-shaped member 80 which is fitted on the partition structure 36. More specifically, the cap-shaped member 80 has a cylindrical portion which is fitted on the outer circumferential surface of the outer member 40 of the partition structure 36, and a bottom portion which is in contact with one axial end face of the outer member 40 on the side of the pressure-receiving chamber 48. Thus, the cup-shaped member 80 and the partition structure 36 constitute an assembly which is fitted in the cylindrical member 22 of the second support structure 12. The cap-shaped member 80 has a circular window 84 formed through a central part of the bottom portion thereof, such that the window 84 is closed by a flexible film 82 fixed to the bottom portion of the member 80. With the cup-shaped member 80 assembled with the partition structure 36, a circular fluid-tight space 86 having a suitable volume is defined between the the flexible film 82 and the inner member 42 of the partition structure 36. That is, the space 86 is provided on one of the opposite sides of the flexible film 82 remote from pressure-receiving chamber 48. This space 86 functions to allow the flexible film 82 to perform a given amount of elastic deformation or displacement so as to absorb a pressure change in the pressure-receiving chamber 48 upon application of vibrations in a given frequency range.

In the instant embodiment, the elastic displacement of the flexible film 82 is particularly effective to absorb the pressure change in the pressure-receiving chamber 48 which takes place as a result of high-frequency small-amplitude vibrations such as booming noise applied to the elastic mount, thereby preventing an undesirable increase in the dynamic spring constant of the elastic mount. The amount of elastic displacement of the flexible film 82 and the volume of the space 86 are determined so that the flexible film 82 cannot be displaced so as to absorb the pressure change which occurs in the pressure-receiving chamber 48 upon application of medium- to large-amplitude vibrations, such as engine shake and bounce, and the engine idling vibrations.

The inner member 42 of the partition structure 36 is provided with a spiral groove 88, which is formed in the outer circumferential surface of one axial end portion of the member 42 on the side of the pressure-receiving chamber 48, such that the groove 88 extends in the circumferential direction over a little less than two rounds of the member 42. With the openings of the spiral groove 88 being closed by the outer member 40 and the cap-shaped member 80, there is defined a spiral first orifice passage 90 which communicates at one end thereof with the pressure-receiving chamber 48 and at the other end with the first equilibrium chamber 52. The first orifice passage 90 therefore maintains fluid communication between the two chambers 48, 52.

The outer member 40 of the partition structure 36 is formed with an annular groove 92 which is open on one axial end face of the member 40 on the side of the first support structure 10, and which extends in the circumferential direction over a little less than one round of the member 40. With the opening of the annular groove 92 being closed by the bottom portion of the cap-shaped member 80, there is defined an annular second orifice passage 94 which communicates at one end thereof with the pressure-receiving chamber 48 and at the other end with the second equilibrium chamber 56. The second orifice passage 94 therefore maintains fluid communication between the two chambers 48, 56.

As is apparent from FIG. 1, the second orifice passage 94 has a larger cross sectional area and a shorter circumferential length than the first orifice passage 90. That is, the ratio of the cross sectional area to the length of the second orifice passage 94 is greater than that of the first orifice passage 90. Accordingly, the resonance frequency of the fluid flowing through the second orifice passage 94 is determined to be higher by a suitable value than that of the fluid flowing through the first orifice passage 90. In the instant embodiment, in particular, the first orifice passage 90 is tuned so that the elastic mount exhibits a sufficiently high damping effect with respect to low-frequency vibrations, such as engine shake and bounce, based on the resonance of the fluid flowing through the first orifice passage 90. On the other hand, the second orifice passage 94 is tuned so that the engine mount exhibits a sufficiently reduced dynamic spring constant with respect to medium-frequency vibrations, such as engine idling vibrations, based on the resonance of the fluid flowing through the second orifice passage 94.

Upon application of a vibrational load between the first and second support structures 10, 12, the non-compressible fluid is forced to flow between the pressure-receiving chamber 48 and the first and second equilibrium chambers 52, 56, through the respective first and second orifice passages 90, 94, based on a pressure difference between the pressure-receiving chamber 48 and the two equilibrium chambers 52, 56. In the instant embodiment, the fluid is forced to flow through a selected one of the first and second orifice passages 90, 94, by placing the switch valves 72, 76 selectively in the first position in which the first or second air chamber 62, 64 is open to the atmosphere, and the second position in which the air chamber 62, 64 is connected to the vacuum pressure source 78. Thus, the instant elastic mount exhibits desired vibration damping or isolating characteristics, depending upon the type of the vibrations applied thereto, based on the resonance of the fluid flowing through the selected one of the two orifice passages 90, 94.

Figure 2:
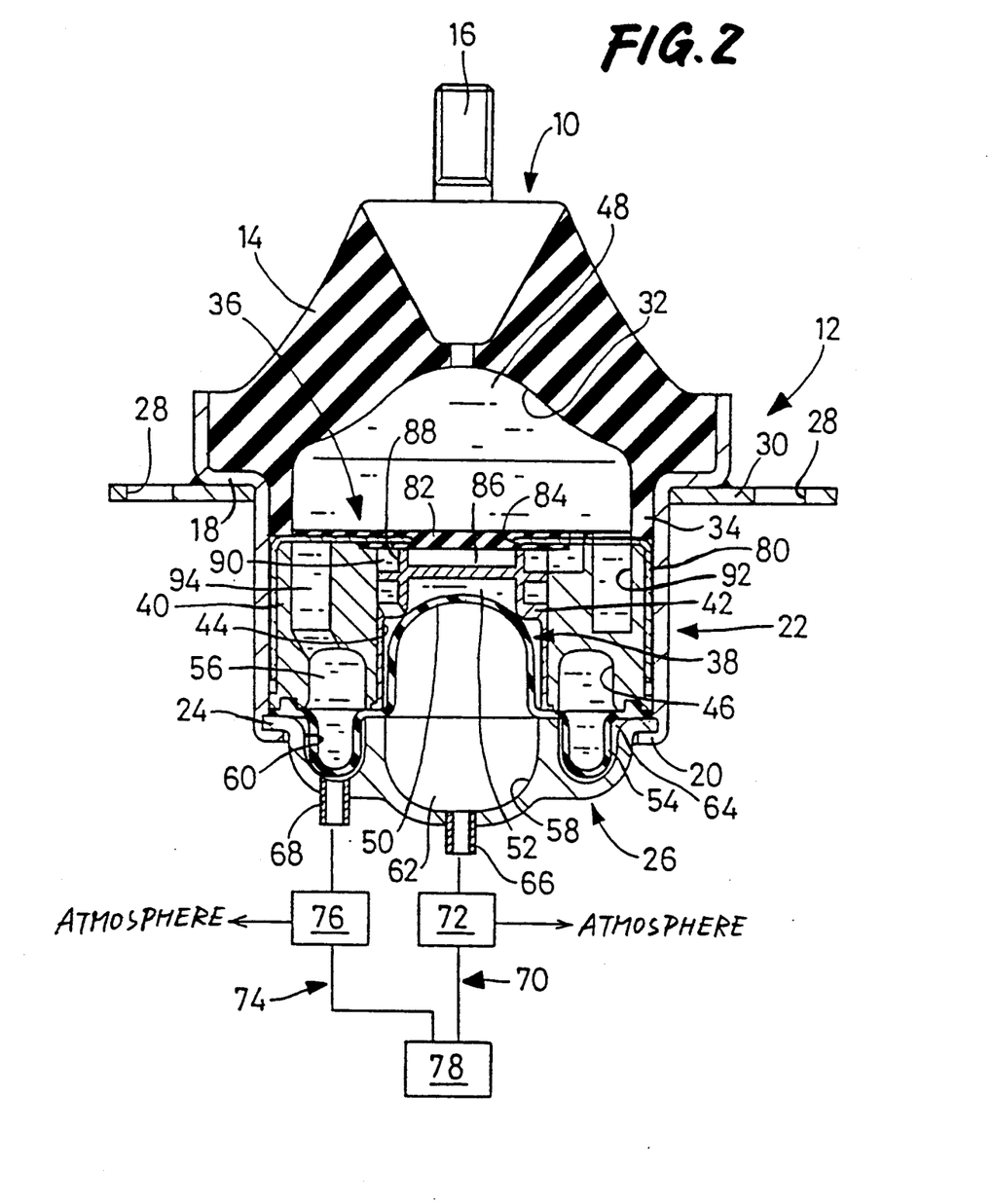
FIG. 2 is an elevational view in axial cross section of the engine mount of FIG. 1, when a vacuum pressure is applied to a second air chamber of the engine mount.

More specifically, when the engine mount receives low-frequency vibrations such as engine shake and bounce, which should be damped by the fluid flows through the first orifice passage 90, the switch valve 72 is operated to the first position for exposing the first air chamber 62 to the atmosphere, while the switch valve 76 is operated to the second position for connecting the second air chamber 64 to the vacuum pressure source 78. As a result, the radially outer portion 54 of the diaphragm 38 is drawn onto the inner surface of the bottom member 26 defining the second air chamber 64, as shown in FIG. 2, and is prevented from being freely deformed so as to accommodate the volumetric change in the second equilibrium chamber 56. This means that the pressure change in the second equilibrium chamber 56 is not absorbed by the elastic displacement of the radially outer portion 54 of the diaphragm 38. Consequently, the fluid flows through the second orifice passage 94 are inhibited while effective flows of the fluid occur through the first orifice passage 90, whereby the elastic mount is able to effectively damp the low-frequency vibrations, based on the resonance of the fluid flowing through the first orifice passage 90.

Figure 3:
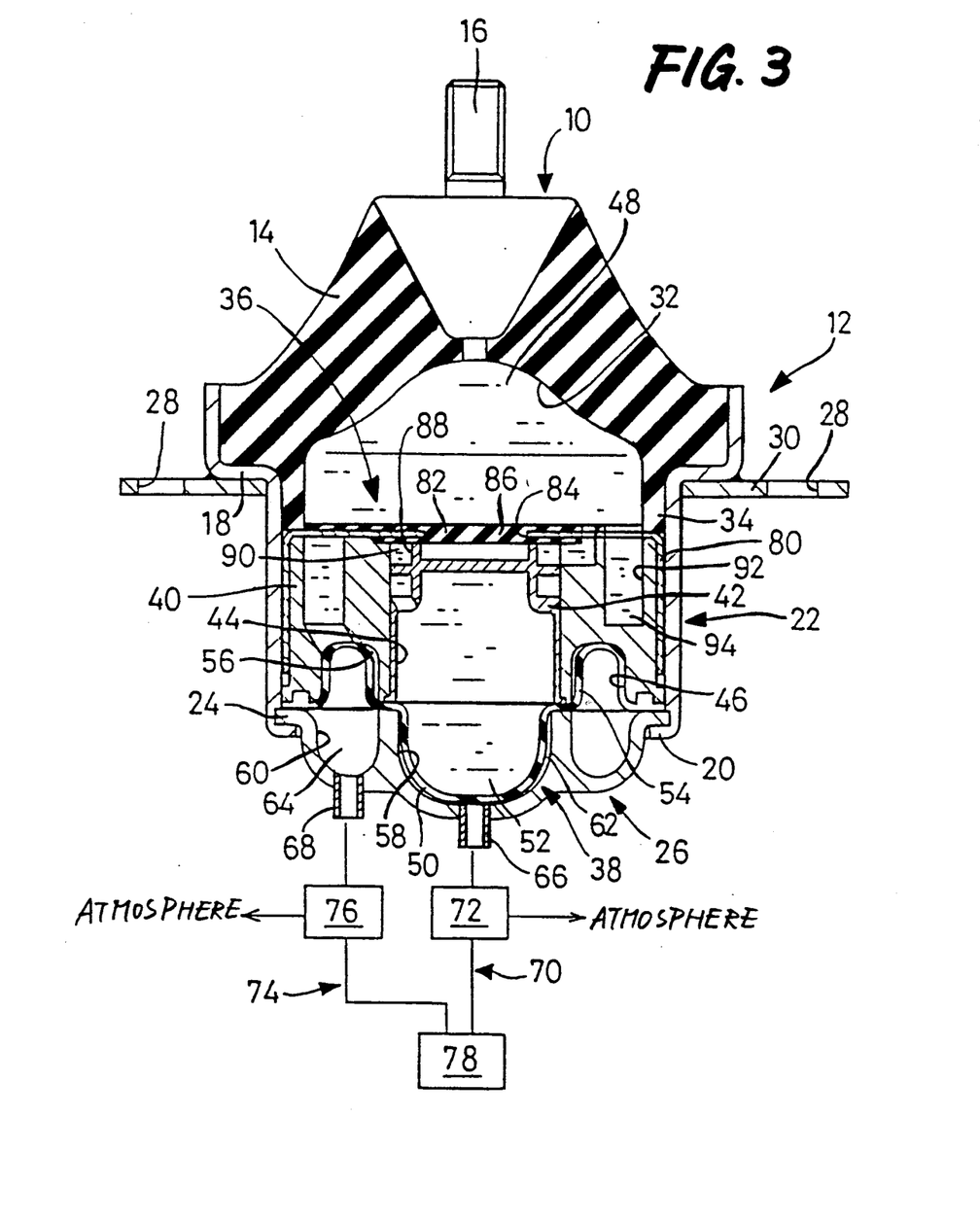
FIG. 3 is an elevational view in axial cross section of the engine mount of FIG. 1, when a vacuum pressure is applied to a first air chamber of the engine mount.

On the other hand, when the elastic mount receives medium-frequency vibrations, such as engine idling vibrations, which should be isolated by fluid flows through the second orifice passage 94, the switch valve 72 is operated to the second position for connecting the first air chamber 62 to the vacuum pressure source 78, while the switch valve 76 is operated to the first position for exposing the second air chamber 64 to the atmosphere. As a result, the radially inner portion 50 of the diaphragm 38 is drawn onto the inner surface of the bottom member 26 defining the first air chamber 62, as shown in FIG. 3, and is prevented from being freely deformed so as to accommodate the volumetric change in the first equilibrium chamber 52. This means that the pressure change in the first equilibrium chamber 52 is not absorbed by the elastic displacement of the radially inner portion 50 of the diaphragm 38. Consequently, the fluid flows through the first orifice passage 90 are inhibited while effective flows of the fluid occur through the second orifice passage 94, whereby the elastic mount is able to provide a sufficiently lowered dynamic spring constant with respect to the medium-frequency vibrations, based on the resonance of the fluid flowing through the second orifice passage 94.

In the manner as described above, the present elastic mount can exhibit different vibration damping or isolating characteristics depending upon the type of the input vibrations, by simply controlling the switch valves 72, 76 depending upon the condition of the vehicle. More specifically, the switch valves 72, 76 are controlled such that the first air chamber 62 is exposed to the atmosphere and the second air chamber 64 is connected to the vacuum pressure source 78 while the vehicle is running, and such that the first air chamber 62 is connected to the vacuum pressure source 78 and the second air chamber 64 is exposed to the atmosphere when the vehicle is at a stop with the engine idling. According to this control arrangement, the elastic mount provides a sufficiently high damping effect with respect to the engine shake and other low-frequency vibrations usually generated during running of the vehicle, based on the resonance of the fluid mass flow through the first orifice passage 90. At the same time, the elastic mount provides a sufficiently lowered dynamic spring constant with respect to the engine idling vibrations generated while the vehicle is parked with the engine idling, based on the resonance of the fluid mass flow through the second orifice passage 94. In this manner, the present elastic mount assures significantly improved driving comfort of the vehicle.

In the elastic mount constructed as described above, the non-compressible fluid in the mount is caused to flow selectively through the first or second orifice passage 90, 94, by simply operating the switch valves 72, 76 so as to control the pressures in the first and second air chambers 62, 64. Thus, the present elastic mount is comparatively simple in construction since the pressure control means (66, 68, 70, 72, 74, 76, 78) for changing the pressures in the first and second air chambers 62, 64 for providing the two different operating characteristics is almost entirely disposed outside the body of the elastic mount. That is, it is not necessary to provide the elastic mount with a control valve for selectively opening and closing the two orifice passages and an actuator for operating the control valve, which control valve and actuator are incorporated within the structure of the elastic mount.

When the concept of the present invention is applied to a vehicle engine mount as in the illustrated embodiment, the intake pressure of the vehicle engine can be readily utilized as the vacuum pressure applied to the first and second air chambers 62, 64.

Further, the elastic mount of the instant embodiment is provided with the flexible film 82 which serves to absorb the pressure change which occurs in the pressure-receiving chamber 48 upon application of relatively small-amplitude vibrations having high frequencies. In this arrangement, the elastic mount provides a sufficiently lowered dynamic spring constant with respect to the high-frequency vibrations such as booming noise, for which the second orifice passage 90 cannot provide a low dynamic spring constant, irrespective of the operating conditions of the switch valves 72, 76.

While the present invention has been described in its presently preferred embodiment with a certain degree of particularly, for illustrative purpose only, it is to be understood that the invention is not limited to the details of the illustrated embodiment, but may be embodied otherwise.

Since the first orifice passage 90 is tuned to a lower frequency range of vibrations than the second orifice passage 94 in the illustrated embodiment, the flow resistance of the fluid in the first orifice passage 90 extremely increases when the elastic mount receives vibrations in a middle frequency range to which the second orifice passage 94 is tuned. Accordingly, upon application of such middle-frequency vibrations, a sufficient amount of the fluid may be forced to flow through the second orifice passage 94, without applying the sub-atmospheric pressure to the first air chamber 62 as described above, assuring an effectively reduced dynamic spring constant of the mount with respect to the middle-frequency vibrations. Therefore, unlike the illustrated embodiment, the first air chamber 62 may be always held in communication with the atmosphere, or may be closed with a suitable volume of air contained therein, while the second air chamber 64 communicates with a selected one of the vacuum pressure source 78 and the atmosphere, so that the elastic mount can provide different vibration damping or isolating characteristics depending upon the type of input vibrations, based on the fluid flows through the first or second orifice passage 90, 94. However, a still larger amount of the fluid is forced to flow through the second orifice passage 94 upon application of the middle-frequency vibrations, when the sub-atmospheric pressure is applied to the first air chamber 62 by the vacuum pressure source 78 as in the illustrated embodiment, assuring a higher degree of vibration isolating effect of the elastic mount.

The constructions and configurations of the first and second orifice passages 90, 94 may be suitably modified according to the required vibration isolating or damping characteristics.

While the pressure control means is adapted to control the pressures in the air chambers 62, 64 by communicating the air chambers 62, 64 selectively with the atmosphere or with the vacuum pressure source 78 in the illustrated embodiment, the pressure control means according to the invention may use a pressure source for applying a pressure higher than the atmospheric pressure, in addition to the vacuum pressure source. In this case, the air chamber is connected to the above-indicated pressure source instead of being exposed to the atmosphere, so that a predetermined level of pressure (higher than the atmospheric pressure) is applied to the air chamber. Alternatively, the air chamber may be fluid-tightly closed such that the pressure in the air chamber is substantially equal to the atmospheric pressure. In the above two cases, the compression of the air present in the air chamber permits elastic deformation of the corresponding portion of the diaphragm adjacent to the air chamber. Further, the sub-atmospheric pressure may be applied to the air chamber, by connecting the air chamber with the vacuum pressure source for a while, and then fluid-tightly closing the air chamber so that the air chamber is maintained at the sub-atmospheric pressure.

In the illustrated embodiment, the elastic mount uses the flexible film 82 along with the space 86 for absorbing the pressure change in the pressure-receiving chamber 48 upon application of high-frequency vibrations, to thereby avoid an increase in the dynamic spring constant of the mount. However, the elastic mount of the invention does not necessarily require such a pressure absorbing system as the flexible film 82.

While the illustrated embodiment of the invention is used as an engine mount for an automotive vehicle, the principle of the present invention is equally applicable to any fluid-filled elastic mounts other than the engine mount, for example, to a vehicle body mount and a cab mount for the vehicle, and even applicable to fluid-filled vibration damping/isolating components used for various devices or equipment other than those for automotive vehicles.

It is to be understood that the present invention may be embodied with various other changes, modifications and improvement, which may occur to those skilled in the art, without departing from the scope of the invention defined in the following claims.

What is claimed is:

1. A fluid-filled elastic mount for flexibly connecting two members, comprising:

a first support structure and a second support structure which are respectively fixed to the two members to be flexibly connected, and which are spaced apart from each other in a load-receiving direction in which vibrations are applied to the elastic mount, said load-receiving direction being in a axial direction of the elastic mount;

an elastic body interposed between said first and second support structures for elastically connecting the first and second support structures;

a partition structure supported by said second support structure so as to extend in a direction substantially perpendicular to said load-receiving direction;

said elastic body at least partially defining a pressure-receiving chamber disposed on one side of opposite sides of said partition structure on the side of said first support structure, said pressure-receiving chamber being filled with a non-compressible fluid, a pressure of said fluid in said pressure-receiving chamber changing due to elastic deformation of said elastic body upon application of the vibrations of said load-receiving direction;

a first flexible diaphragm cooperating with said partition structure to define a first variable-volume equilibrium chamber disposed on the other side of said partition structure remote from said pressure-receiving chamber, said first equilibrium chamber being filled with said non-compressible fluid, said first flexible diaphragm being elastically deformable so as to absorb a change in a pressure on said fluid within said first equilibrium chamber;

said second support structure and said first flexible diaphragm cooperating with each other to define a first air chamber which is separated from said first equilibrium chamber by said first flexible diaphragm, for permitting the first flexible diaphragm to elastically deform;

said partition structure at least partially defining a first orifice passage for fluid communication between said pressure-receiving and first equilibrium chambers to permit flow of said fluid therebetween;

a second flexible diaphragm cooperating with said partition structure to define a second variable-volume equilibrium chamber disposed on the other side of said partition structure remote from said pressure-receiving chamber, said second equilibrium chamber being filled with said non-compressible fluid, said second flexible diaphragm being elastically deformable so as to absorb a change in a pressure of said fluid within said second equilibrium chamber;

said second support structure and said second flexible diaphragm cooperating with each other to define a second air chamber which is separated from said second equilibrium chamber by said second flexible diaphragm, for permitting the second flexible diaphragm to elastically deform;

said partition structure at least partially defining a second orifice passage for fluid communication between said pressure-receiving and second equilibrium chambers to permit flow of said fluid therebetween, said second orifice passage have a ratio of a cross sectional area thereof to a length thereof, which ratio is higher than that of said first orifice passage;

means for structurally separating said first and second equilibrium chambers from each other; and pressure control means connected to said second air chamber for changing a pressure in said second air chamber, said pressure control means comprising switching means operable between a first position for communication of said second air chamber with a first pressure, and a second position for communication of said second air chamber with a second pressure higher than said first pressure, said non-compressible fluid flowing substantially exclusively through said first orifice passage when said switching means is placed in said first position, and through said second orifice passage when said switching means is placed in said second position.

2. A fluid-filled elastic mount according to claim 1, wherein said pressure control means further comprises a vacuum pressure source for providing said second air chamber with a sub-atmospheric pressure as said first pressure when said switching means is placed in said first position, said second air chamber being held in communication with an atmosphere having an atmospheric pressure as said second pressure when said switching means is placed in said second position.

3. A fluid-filled elastic mount according to claim 1, wherein said second support structure comprises a hole communicating with said second air chamber, said pressure control means comprising an air conduit connected to said hole of said second support structure for changing the pressure in said second air chamber.

4. A fluid-filled elastic mount according to claim 3, wherein said air conduit is connected to said hole of said second support structure through a connector fitted in said hole of the second support structure.

5. A fluid-filled elastic mount according to claim 1, further comprising pressure absorbing means for absorbing a change in a pressure of said non-compressible fluid in said pressure-receiving chamber upon application of the vibrations in a predetermined range of frequencies higher than those of vibrations which are damped or isolated based on resonance of the fluid flowing through said first and second orifice passages, said pressure absorbing means comprising a flexible film which extends in said direction substantially perpendicular to said load-receiving direction so as to partially define said pressure-receiving chamber.

6. A fluid-filled elastic mount according to claim 1, wherein said partition structure comprises a generally cylindrical inner member which substantially defines said first orifice passage, and a generally cylindrical outer member which is disposed radially outwardly of said inner member to substantially define said second orifice passage.

7. A fluid-filled elastic mount according to claim 1, wherein said pressure control means is also connected to said first air chamber to change a pressure in said first air chamber, said pressure control means further comprising another switching means which is operable between a first position for communication of said first air chamber with said first pressure, and a second position for communication of said first air chamber with said second pressure, said non-compressible fluid flowing substantially exclusively through said first orifice passage when said switching means is placed in said first position while said another switching means is placed in said second position, and through said second orifice passage when said switching means is placed in said second position while said another switching means is placed in said first position.

8. A fluid-filled elastic mount according to claim 7, wherein said pressure control means further comprises a vacuum pressure source for providing a sub-atmospheric pressure as said first pressure when said switching means and said another switching means are placed in said first positions, said first air chamber and said second air chamber being held in communication with an atmosphere having an atmospheric pressure as said second pressure when said switching means and said another switching means are placed in said second positions, respectively.

9. A fluid-filled elastic mount according to claim 1, wherein said second air chamber consists of an annular chamber formed radially outwardly of said first air chamber.

10. A fluid-filled elastic mount according to claim 9, wherein said first and second flexible diaphragms consist of a single integral diaphragm having a radially inner portion which partially defines said first air chamber, and a radially outer portion which partially defines said second air chamber.

* * * * *